T. Barbour,
Camera Attachment.
Nº 61,139.    Patented Jan. 15, 1867.
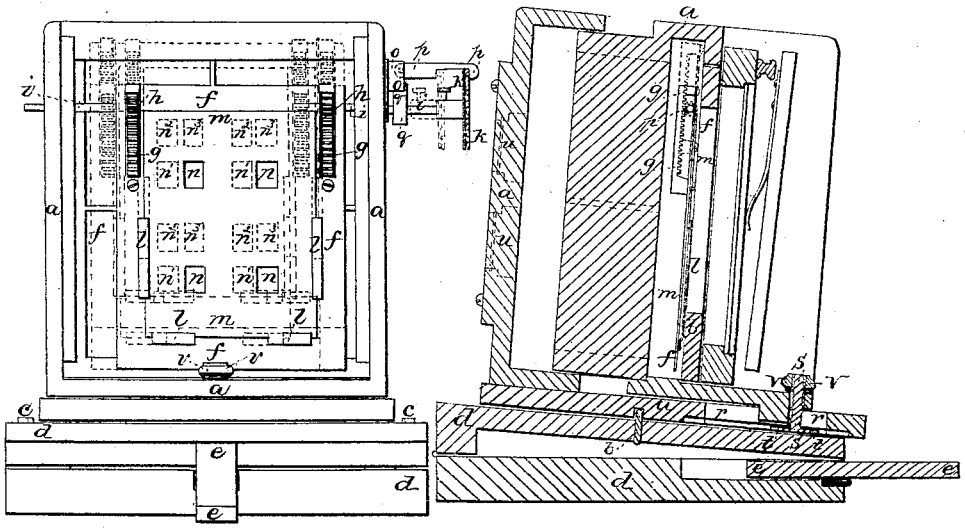
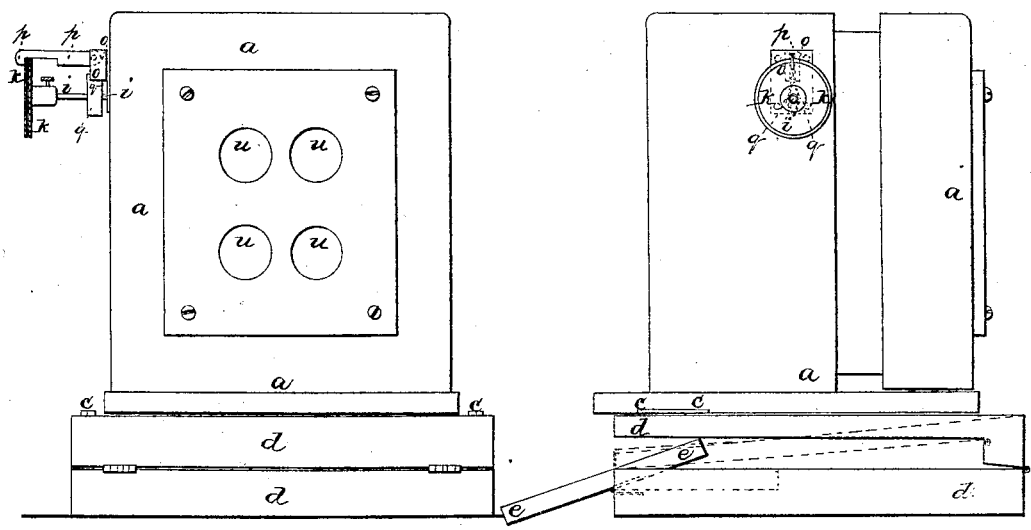
Witnesses,
Saml. K. Barton
George W. Mann
Inventor,
Thos. Barbour

United States Patent Office.

THOMAS BARBOUR, OF BOSTON, MASSACHUSETTS.

Letters Patent No. 61,139, dated January 15, 1867.

IMPROVEMENT IN PHOTOGRAPHIC CAMERAS.

*The Schedule referred to in these Letters Patent and making part of the same.*

TO ALL PERSONS TO WHOM THESE PRESENTS SHALL COME:

Be it known that I, THOMAS BARBOUR, of Boston, in the county of Suffolk, and State of Massachusetts, have invented certain new and useful Improvements in Cameras for taking Photographic Impressions, etc ; and that the following description, taken in connection with the accompanying plate of drawings, hereinafter referred to, forms a full and exact specification of the same, wherein I have set forth the nature and principles of my said improvements, by which my invention may be distinguished from all others of a similar class, together with such parts as I claim, and desire to have secured to me by Letters Patent.

The present invention relates to certain new and useful improvements in cameras for taking photographic and other like impressions, and consists in so arranging a series of devices as to allow the camera to be more readily, conveniently, and accurately adjusted; also so arranging and operating a plate within the same as to permit of a greater number of impressions being taken on one plate with more ease and rapidity than has heretofore been accomplished by the means formerly used.

Improvements in cameras have from time to time been made to obviate the inconvenience and delay occasioned by the use of separate plates for each impression, such as the employment of a single sliding-plate, by causing the lens of the camera to be made adjustable, and by various other similar methods. And although the purpose of these former improvements may be identical with the present one, the arrangement and operation of their devices are entirely dissimilar, as will be seen by the following description, and the accompanying plate of drawings, of which—

Figure 1 is a rear view of my improved camera, with the glass and frame removed.

Figure 2 is a central vertical longitudinal section.

Figure 3 is a front, and

Figure 4, a side view.

$a\ a\ a$, in the drawings, represent the case or outside frame of a camera, which turns on a pivot, $b$, so as to allow of its being adjusted laterally, and is prevented from turning beyond the desired position on either side by stop-pieces, $c\ c$, attached to the top of an adjustable stand, $d\ d$, that is made in two portions. The upper portion of the stand $d\ d$ is hinged to the lower portion, and is operated by a lever, $e\ e$, hinged at its centre to the lower portion of the stand $d\ d$ in such a manner that the upper portion of the stand $d\ d$, and consequently the case $a\ a$, which rests upon it, may be raised or lowered thereby. Within the case $a\ a$ is a plate, $ff$, on each side of which are attached racks, $gg$, in which engage pinions, $h\ h$, attached to a rod or shaft, $ii$. This rod, $ii$, extends between the plate $ff$ and racks $g\ g$, and through the sides of the camera case $a\ a$, and serves to support and operate the plate $ff$. On the back of the plate $ff$ slips, $ll$, are formed to receive and hold a plate, $m\ m$, in which are made four openings, $n\ n\ n\ n$, corresponding in size to the impressions to be taken, and behind which is placed the material prepared for the impressions. Attached to one end of the rod $ii$, on the outside of the case $a\ a$, is a wheel, $k\ k$, by turning which the teeth of the pinions $h\ h$ are made to engage with those of the racks $g\ g$ in such a manner as to raise or lower, as may be desired, the plate $ff$. Extending over the wheel $k\ k$, and pivoted to a standard, $o\ o$, is a movable arm, $p\ p$, having a portion of its under side cut away so as to allow the top of the wheel $k\ k$ to travel therein and to regulate the proper distance, that the rod $ii$ may be pushed in or drawn out; the rod $ii$ being allowed to play freely in its bearing, $q\ q$, attached to the standard $o\ o$ and the sides of the case $a\ a$, through which it passes. In the bottom of the outer case $a\ a$ a slot, $r\ r$, is formed, through which plays a screw or pivot, $s\ s$, attached to a slide, $t\ t$, for the purpose of increasing or diminishing the distance between the plate $ff$ and the lens $u\ u$ of the camera $a\ a$; and when the case $a\ a$ is brought to the desired position, it is held therein by means of a screw-cap, $v\ v$, being screwed down upon the bottom of the case $a\ a$, so as to form a firm bearing thereon. In the front of the camera $a\ a$ are four lenses, $u\ u$, which permit four impressions of one object to be taken at one time on the same plate. It will readily be observed that when these four impressions, represented in the drawings by the openings $n\ n\ n\ n$, have been taken by pressing in the wheel $k\ k$, attached to the rod $ii$, which is connected with the plate $ff$ by the pinions $h\ h$ and racks $g\ g$, the plate $ff$ is moved one side, and space is left on the plate $ff$ for four more impressions, $n^1\ n^1\ n^1\ n^1$, shown by dotted lines in fig. 1. By turning the wheel $k\ k$ the pinions $h\ h$ are made to engage in the racks $g\ g$, and the plate $ff$ is raised or lowered thereby, and four other impressions, $n^2 n^2 n^2 n^2$, as shown by the dotted red lines, are produced. By drawing out the wheel $k\,k$ the plate $ff$ is moved back again and four more impressions, $n^3 n^3 n^3 n^3$, shown by the dotted blue lines, are taken over those first made. Thus it will be observed that eight or more impressions can be taken on one plate, and the instrument quickly and accurately adjusted to the proper focus and angle of light, so that all the impressions can be taken at one sitting, thereby saving time, labor, and expense to the operator, and inconvenience and fatigue to the sitter.

From the foregoing description, reference being made to the drawings, it will be seen that, by unloosening the screw-cap $v\,v$, the screw or pivot $s\,s$ and the slide $t\,t$, to which it is attached, are allowed to play freely up and down in the slot $r\,r$, thereby allowing the distance between the lenses $u\,u$ and plate $ff$ to be easily and conveniently regulated, and the proper focus obtained. By raising the case $a\,a$ by pressing upon one end of the lever $e\,e$, connected with the stand $d\,d$, or by moving the case $a\,a$ either to the right or left, as may be desired, by means of the pivot $b$, on which it turns, the instrument can be readily and accurately adjusted to the required position, which, in the latter case, is determined by the stop-pieces $c\,c$, and the desired angles of light obtained with less trouble and inconvenience than has heretofore been experienced. Thus, when the lateral movements of the plate $ff$ are made, a corresponding change must be made in the position of the case in order that the rays of light shall impinge exactly upon the spots on the plate where the impressions are to be taken; therefore the case has been placed loosely upon the stand, with no positive means of setting it at the proper angle, its desired position being obtained only after repeated trials. By the above-described arrangements the relative positions of the movable plate in the case are determined with regard to each other by one simple movement. When the plate is moved vertically the lever serves the same purpose in adjusting the case, so as to bring the rays of light to bear upon the proper points of the plate.

Having thus described my improvements, I shall state my claims as follows:

What I claim, as my invention, and desire to have secured to me by Letters Patent, is—

1. The arrangement of the plate $ff$, racks $g\,g$, pinions $h\,h$, rod $i\,i$, wheel $k\,k$, and adjustable arm $p\,p$, as hereinabove described and for the purposes specified.

2. Arranging the case upon a pivot, so as to turn thereon in combination with suitable stops, as herein described and for the purpose specified.

3. The use of the lever $e\,e$ for elevating and depressing the case, as described.

4. The use of the movable plate or frame $ff$, operating as described and for the purpose specified.

THOS. BARBOUR.

Witnesses:
JOSEPH GAVETT,
SAMUEL M. BARTON.